United States Patent
Luciani

(10) Patent No.: US 11,720,717 B2
(45) Date of Patent: Aug. 8, 2023

(54) SYSTEM MEMORY INFORMATION PROTECTION WITH A CONTROLLER

(71) Applicant: HEWLETT PACKARD ENTERPRISE DEVELOPMENT LP, Houston, TX (US)

(72) Inventor: Luis Luciani, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 274 days.

(21) Appl. No.: 17/123,279

(22) Filed: Dec. 16, 2020

(65) Prior Publication Data
US 2022/0188468 A1 Jun. 16, 2022

(51) Int. Cl.
*G06F 21/79* (2013.01)
*G06F 12/14* (2006.01)
*H04L 9/08* (2006.01)
*H04L 9/32* (2006.01)

(52) U.S. Cl.
CPC .......... *G06F 21/79* (2013.01); *G06F 12/1458* (2013.01); *H04L 9/0894* (2013.01); *H04L 9/3247* (2013.01); *G06F 2212/1052* (2013.01)

(58) Field of Classification Search
CPC ................. G06F 21/79; G06F 12/1458; G06F 2212/1052; H04L 9/0894; H04L 9/3247
See application file for complete search history.

(56) References Cited

U.S. PATENT DOCUMENTS

| 8,997,205 | B1* | 3/2015 | Seshadri | G06F 21/46 |
| | | | | 718/1 |
| 9,268,594 | B2 | 2/2016 | Shanbhogue et al. | |
| 2007/0005935 | A1 | 1/2007 | Khosravi et al. | |
| 2008/0034440 | A1* | 2/2008 | Holtzman | H04L 9/3228 |
| | | | | 713/193 |
| 2014/0105244 | A1* | 4/2014 | Moore | G06F 1/206 |
| | | | | 374/102 |
| 2015/0372812 | A1* | 12/2015 | Parann-Nissany | H04L 63/06 |
| | | | | 380/44 |
| 2018/0365451 | A1* | 12/2018 | Ndu | G06F 21/78 |
| 2019/0095593 | A1 | 3/2019 | Cisneros et al. | |

OTHER PUBLICATIONS

HPE, "HPE next-generation intrusion detection system", Technical white paper, Mar. 2019, 5 pages.
Hewlett Packard Enterprise, Hpe Secure Compute Lifecycle: Building on the world's most secure industry standard servers to optimize your security environment, Technical white paper, Jun. 2017 (20 pages).
Latzo, T. et al.; BMCLeech: Introducing Stealthy Memory Forensics to BMC; (Research Paper), Forensic Science International: Digital Investigation vol. 32; 300919; Apr. 2020, 7 Pgs.

(Continued)

*Primary Examiner* — Ayoub Alata
(74) *Attorney, Agent, or Firm* — Trop, Pruner & Hu, P.C.

(57) ABSTRACT

In some examples, a controller includes a secure memory to store a key, and a processor to access a system memory that is external of the controller and that is accessible by a main processor separate from the controller, protect information retrieved from the system memory using the key to produce protected information, and store the protected information in the system memory.

20 Claims, 4 Drawing Sheets

(56) References Cited

OTHER PUBLICATIONS

Perigaud, F.; Using Your BMC as a DMA Device: Plugging PCILEECH to HPE ILO 4; (Web Page), Dec. 20, 2018, 5 Pgs.
Wikipedia, As a service last edited Nov. 5, 2020 (5 pages).
Wikipedia, Comparison of cryptography libraries last edited on Nov. 15, 2020 (13 pages).
Wikipedia, Digital signature last edited on Nov. 4, 2020 (17 pages).
Wikipedia, Direct memory access last edited on Sep. 22, 2020 (11 pages).

* cited by examiner

SYSTEM MEMORY INFORMATION PROTECTION WITH A CONTROLLER

BACKGROUND

Cryptographic services can be employed to protect information that may be stored in a computer system. Examples of cryptographic services include encrypting information to produce encrypted information, or signing of information to provide a digital signature.

BRIEF DESCRIPTION OF THE DRAWINGS

Some implementations of the present disclosure are described with respect to the following figures.

Figure 1:
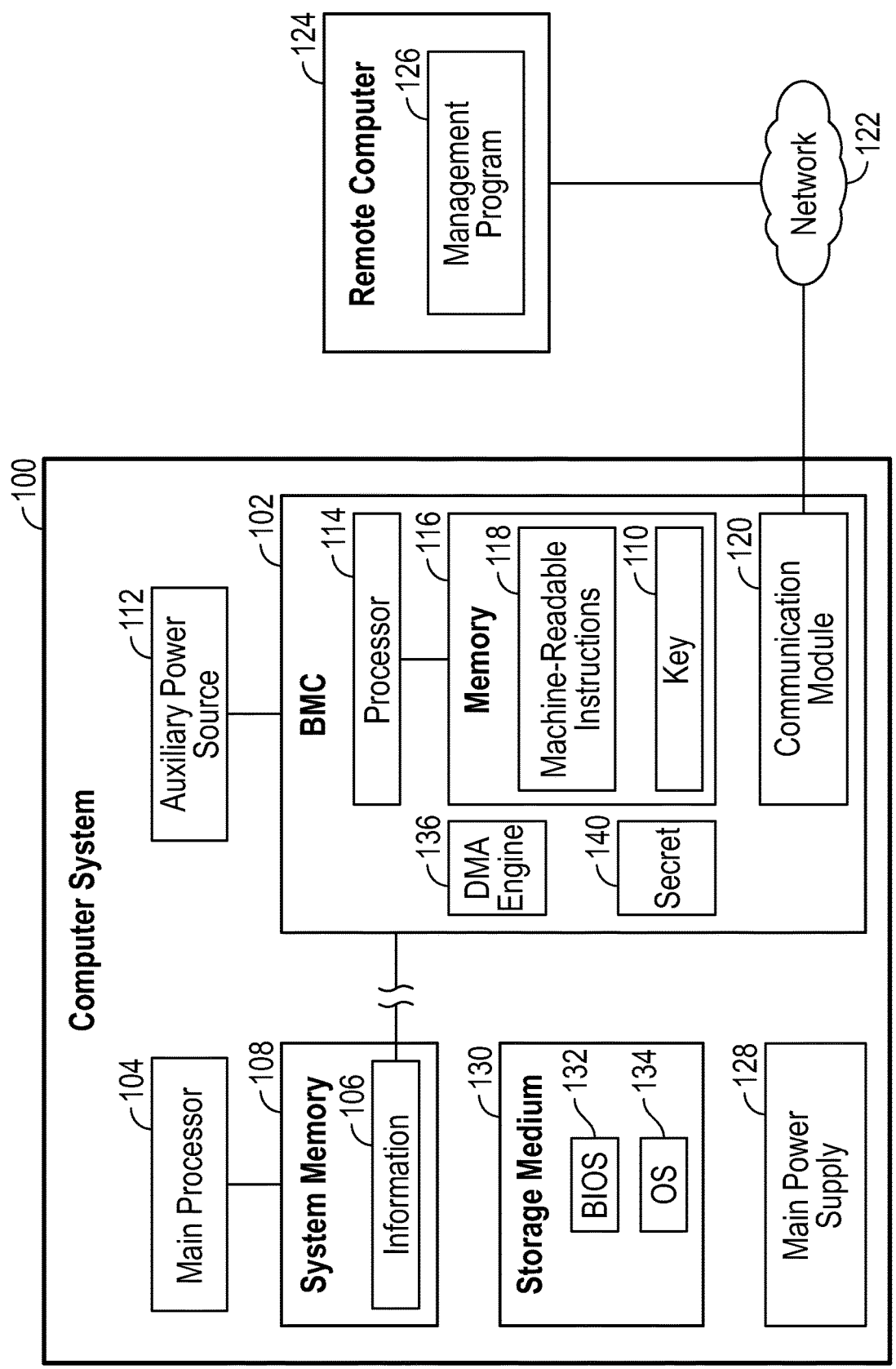
FIG. 1 is a block diagram of an arrangement that includes a computer system with a baseboard management controller (BMC) usable to protect information in a system memory, in accordance with some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

To enable the performance of cryptographic services, various actions are performed. For example, a seed and/or an initialization vector used as part of the cryptographic services are obtained. Seeds and initialization vectors can be used as part of generating keys, for example.

Additionally, there may be a number of cryptography libraries that are available, and a selection may have to be made from among the cryptography libraries. The cryptography libraries provide respective cryptography algorithms that can be used in performing cryptographic services. A further complexity is the choice of which keys to use for performing encryption or cryptographically signing of information. Moreover, a choice may have to be made regarding where to store keys.

If any of the foregoing actions are omitted or if an incorrect choice is made, then cryptographic services may not offer adequate protection.

In addition, a computer system may be divided into multiple security domains, which can add to the complexity of performing cryptographic services. Examples of security domains include a security domain associated with an operator of the computer system, and a security domain associated with a tenant of services provided by the computer system, such as in examples where the computer system is a server (e.g., a cloud server, a data center server, etc.) that provides as-a-Service offerings.

Cryptographic services can include performing encryption or cryptographically signing of information stored in a system memory of a computer system. As used here, a "computer system" can refer to any or some combination of the following: server computer(s), user computer(s), smartphone(s), storage server(s), communication node(s), vehicle(s), controller(s) in a vehicle, and so forth.

The computer system includes a main processor that is able to execute machine-readable instructions of the computer system. A processor can include a microprocessor, a core of a multi-core microprocessor, a microcontroller, a programmable integrated circuit, a programmable gate array, or another hardware processing circuit.

Examples of the machine-readable instructions that can be executed by the main processor include firmware (e.g., a Basic Input/Output System (BIOS), an operating system (OS), an application program, etc.). A "main processor" refers to a processor of the computer system used to perform the majority of operations in the computer system. The main processor is distinguished from other processing circuitry that may be present in the computer system for performing other services. Although referred to in the singular sense, a "main processor" can include multiple processors.

In some examples, cryptographic services may be performed using machine-readable instructions executed on the main processor. However, this may expose the cryptographic services to attack by malware in the computer system or by a remote hacker, since it is possible that the execution environment associated with the main processor has been compromised.

Furthermore, performing cryptographic services using machine-readable instructions executed on the main processor can add to the processing burden of the main processor, since the main processor may have reduced capacity to perform other operations.

In accordance with some implementations of the present disclosure, as shown in FIG. 1, a computer system 100 includes a baseboard management controller (BMC) 102. The computer system 100 can include a single computing device or multiple computing devices (e.g., multiple server computers in a rack, a data center, a cloud environment, etc.).

Although FIG. 1 shows the BMC 102 as being included in the computer system 100 (e.g., contained in a chassis of the computer system 100 along with the computing device (s) of the computer system 100), in other examples, the BMC 102 may be separate from but communicatively coupled to the computer system 100 over a communication link (wired or wireless link).

The computer system 100 also includes a main processor 104, which is separate from the BMC 102. The BMC 102 is used to perform protection of information 106 stored in a system memory 108 based on direct memory access (DMA) of the system memory 108. A DMA access of the system memory 108 allows the BMC 102 to read and/or write information in the system memory 108 without involving the main processor 104 in the access of the system memory 108.

The system memory 108 can be a non-volatile memory and/or a volatile memory implemented using a memory device (or alternatively, multiple memory devices). A non-volatile memory maintains information stored in the memory even if power is removed from the memory. A volatile memory loses stored information if power is removed from the memory. A memory device can include any or some combination of a dynamic random access memory (DRAM) device, a static random access memory (SRAM) device, a flash memory device, and so forth. The system memory 108 is external of the BMC 102.

The BMC 102 uses a key 110 (or alternatively, multiple keys) that is securely stored in a memory 116 (e.g., a non-volatile memory and possibly a volatile memory) of the BMC 102 to protect the information 106 in the system memory 108. The memory 116 is an internal memory of the BMC 102 that an entity outside of the BMC 102 is unable to access without permission of the BMC 102.

The information 106 stored in the system memory 108 can include data (such as user data, application program data, or another type of data). The information 106 stored in the system memory 108 can additionally or alternatively include machine-readable instructions that are executable on the main processor 104. Note that there may be multiple pieces of information to be protected, such as in the form of files, logs, databases, database tables, buffers, data blocks, and so forth.

The BMC 102 is an example of a management controller that is separate from the main processor 104 of the computer system 100. As used herein, a "BMC" is a specialized service controller that monitors the physical state of the computer system 100 using sensors and communicates with a remote management system (that is remote from the computer system 100) through an independent "out-of-band" connection.

The BMC 102 has management capabilities to manage components of the computer system 100. Examples of management capabilities of the BMC 102 can include any or some combination of the following: power control to perform power management of the computer system 100 (such as to transition the computer system 100 between different power consumption states in response to detected events), thermal monitoring and control of the computer system 100 (such as to monitor temperatures of the computer system 100 and to control thermal management devices of the computer system 100), fan control of fans in the computer system 100, system health monitoring based on monitoring measurement data of various sensors of the computer system 100, remote access of the computer system 100 (to access the computer system 100 over a network, for example), remote reboot of the computer system 100 (to trigger the computer system 100 to reboot using a remote command), system setup and deployment of the computer system 100, system security to implement security procedures in the computer system 100, and so forth.

In some examples, the BMC 102 can provide so-called "lights-out" functionality for the computer system 100. The lights out functionality may allow a user, such as a systems administrator, to perform management operations on the computer system 100 even if an operating system (OS) is not installed or not functional on the computer system 100.

Moreover, in some examples, the BMC 102 can run on auxiliary power provided by an auxiliary power source 112 (e.g., a battery); as a result, the computer system 100 does not have to be powered on to allow the BMC 102 to perform the BMC's operations. The auxiliary power supply is separate from a main power supply 128 that supplies powers to other components (e.g., the main processor 104, etc.) of the computer system 100.

The BMC 102 includes a processor 114 that is separate from the main processor 104 that is external of the BMC 102. The memory 116 of the BMC 102 stores machine-readable instructions 118 that are executable on the processor 114 of the BMC 102. The machine-readable instructions 118 can include firmware and/or software of the BMC 102.

The information stored in the memory 116 includes the machine-readable instructions 118 as well as the key 110 that is used by the BMC 102 to protect the information 106 in the system memory 108, according to some implementations of the present disclosure.

The BMC 102 further includes a communication module 120 to allow the BMC 102 to communicate over a network 122, such as with a remote computer 124. The communication module 120 can include a transceiver to transmit and receive signals and/or messages over the network 122, as well as any protocol layers that support various communication protocols for communication of information over the network 122.

The network 122 can include a public network such as the Internet, a local area network (LAN), a wide area network (WAN), a storage area network (SAN), or another type of network, whether wired or wireless.

The remote computer 124 includes a management program 126 (including machine-readable instructions) executed in the remote computer 124 to perform management of the computer system 100.

The main power supply 128 supplies power to electronic components of the computer system 100, including the main processor 104, the system memory 108, a storage medium 130, the BMC 102, and so forth. For example, the main power supply 128 can convert a voltage of an external power source, such as an AC power source, to internal power supply voltages for the electronic components of the computer system 100. If the main power supply 128 is turned off, the BMC 102 can continue to operate using the auxiliary power source 112.

The storage medium 130 can be implemented using a storage device or multiple storage devices, such as a disk-based storage device, a solid-state drive, a memory device, and so forth. The storage medium 130 can be used to store machine-readable instructions and other information of the computer system 100. The machine-readable instructions stored in the storage medium 130 can include a Basic Input/Output System (BIOS) 132, which performs boot operations of the computer system 100. Boot operations include testing and initializing hardware components of the computer system, starting a boot loader, starting an operating system (OS) 134, and so forth. As used here, reference to "BIOS" also includes reference to Unified Extensible Firmware Interface (UEFI) firmware.

The machine-readable instructions stored in the storage medium 130 can also include an OS 134. The OS 134 is considered a "bare metal" OS since it is directly executed by the hardware of the computer system 100. A bare metal OS is distinguished from a guest OS executed in a virtual machine that may be present in the computer system 100.

The BMC 102 further includes a DMA engine 136, which is able to perform a direct access of the system memory 108. The DMA engine 136 can be implemented using processing circuitry of the BMC 102, and/or using machine-readable instructions executable by the BMC 102.

The key 110 that is stored in the memory 116 of the BMC 102 can include a cryptographic key, such as a public key, a private key, a symmetric key, or another type of key. Note that the memory 116 can store multiple keys in other examples. In some examples, the BMC 102 can derive the key 110 using a secret 140 in the BMC 102. The secret 140 can be in the form of a random number or other information, which can be provided in the BMC 102 at the time of manufacture of the BMC 102, or at another configuration stage of the BMC 102. The secret 140 can be used as a seed to generate the key 110 (or multiple keys).

The secret 140 can be stored in a read-only manner, such as by using fuses in the BMC 102, using a read-only memory in the BMC 102, and so forth. In other examples, the secret 140 may be stored in a secure read-write memory, which can be part of the memory 116 or separate from the memory 116.

The key 110 can be used to encrypt the information 106 stored in the system memory 108, which produces encrypted information that cannot be read by entities without an appropriate decryption key to decrypt the encrypted information. For example, the BMC 102 can encrypt the information 106 by applying a public key. An entity that seeks to access the information 106 can decrypt the encrypted information by using a corresponding private key that is part of a public-private key pair. The technique used to encrypt information can be selected by the BMC 102. In some examples, the BMC 102 can use any of various different encryption techniques, such as Advanced Encryption Standard (AES) encryption, Rivest-Shamir-Adleman (RSA) encryption, Data Encryption Standard (DES) encryption, and so forth.

In other examples, the BMC 102 can use the key 110 to cryptographically sign the information 106 in the system memory 108. For example, the key 110 can be a private key that signs the information 106 to produce a digital signature that can be associated with the signed information. The digital signature can be used to verify the authenticity of the information 106 and/or verify an authenticity of a source of the information 106. Examples of digital signature techniques include any of the following: Digital Signature Algorithm (DSA), ElGamal signature scheme, Rabin signature algorithm, and so forth.

In other examples, a controller different from a BMC can use a key(s) (e.g., the key 110) stored in an internal secure memory of the controller to protect the information 106 in the system memory 108. The controller may be separate from the main processor 104, and can be used to implement security operations, including protection of information in the system memory 108. In some examples, the controller may be dedicated to performing security operations. In other examples, the controller is capable of performing security operations. The controller can be in an integrated circuit (IC) chip that is separate from the main processor 104, for example. The controller may also be separate from a BMC in examples where the BMC is present. In addition to protecting information in the system memory 108, the controller can be used to perform other security operations. The controller to perform security operations may be considered a security co-processor.

Figure 2:
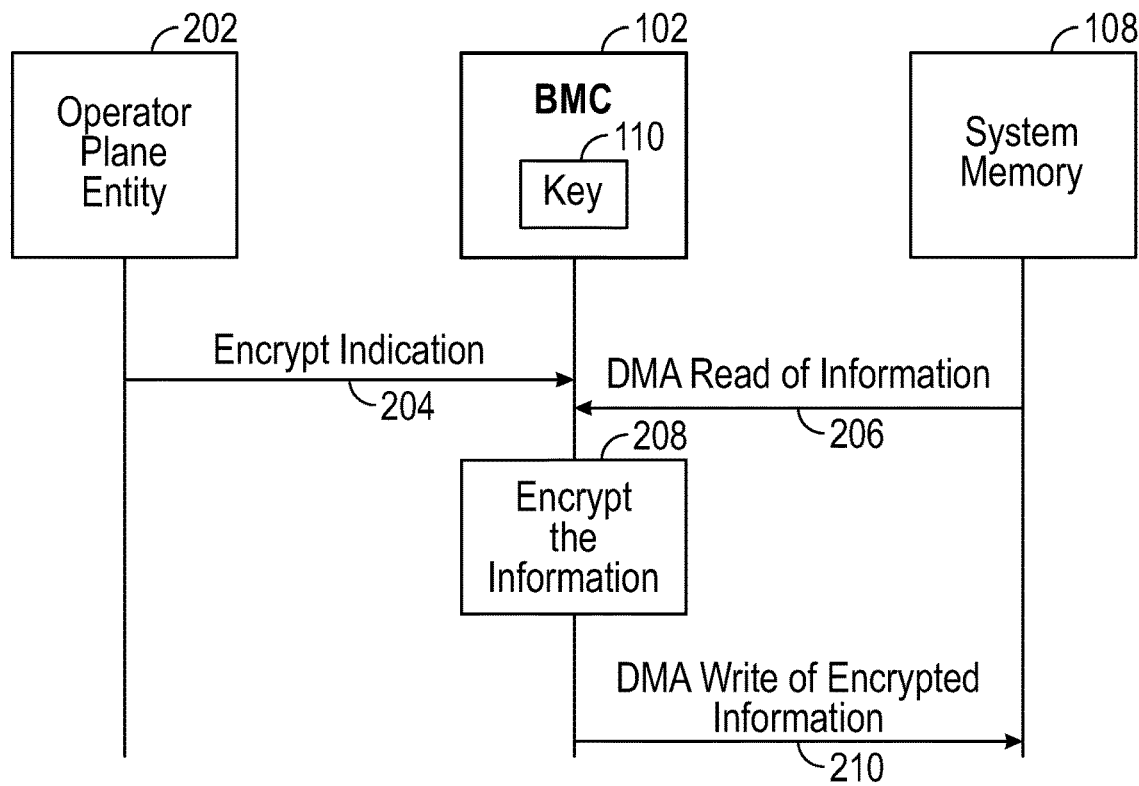
FIG. 2 is a flow diagram of an encryption process according to some examples.

FIG. 2 is a flow diagram illustrating tasks of various entities according to some implementations of the present disclosure. The entities include an operator plane entity 202, the BMC 102, and the system memory 108. The operator plane entity 202 can include the BIOS 132, the OS 134, an application program, or another entity (whether in the form of a program or a hardware component) in an operator plane of the computer system 100.

The operator plane is a security domain that includes components associated with an operator of the computer system 100. In examples where the computer system 100 is part of a cloud or data center, the operator can be the operator of the cloud or the data center. The computer system 100 has resources that can be used by tenants of the cloud or data center. A "tenant" refers to an entity (a user, a group of users, program(s), machine(s), etc.) that can use the resources of the cloud or data center, where the resources can include processor resources, storage resources, program resources, and/or communication resources.

In examples where resources of the computer system 100 are accessible by tenant(s), the computer system 100 can be associated with multiple security domains, where one security domain is the operator plane, while the other security domain(s) includes data plane(s) for respective tenant(s).

In accordance with some examples of the present disclosure, the ability of the BMC 102 to protect the information 106 in the system memory 108 can be employed by an entity in the operator plane, but not by entities in data planes. The operator plane is implicitly authenticated, since components of the operator plane are part of an environment that is relatively secure as compared to environments associated with tenants.

In this manner, cryptographic services are more secure since just entities in the operator plane are authorized to request the cryptographic services. The cryptographic services performed by the BMC 102 in the operator plane are invisible to tenants in the data planes (i.e., the tenants are not aware that the cryptographic services are being performed in the operator plane). Also, cryptographic services using the BMC 102 are more secure since the key(s) 110 is (are) securely stored in the BMC 102, which protects the key(s) 110 from unauthorized access.

By performing the cryptographic services at the BMC 102, processing intensive operations associated with the cryptographic services do not have to be performed on the main processor 104, which frees up the main processor 104 for other tasks.

The operator plane entity 202 is able to request the BMC 102 to protect information 106 of the system memory 108. For example, the BIOS 132, the OS 134 (FIG. 1), or another entity in the computer system 100 may perform an operation that includes a security task (or multiple security tasks), where a security task can involve encrypting information or cryptographically signing information. Additionally, the entity may desire that the encryption or cryptographic signing of information be performed in a secure context, such as in the operator plane that is isolated from data planes. To do so, the entity can invoke the ability of the BMC 102 to protect information in the system memory 108 based on performing DMA reads and writes, and using the key 110 that is securely stored in the BMC 102 (and thus inaccessible to outside entities). In some examples, where persistent storage of the protected information (e.g., encrypted information or a digital signature) is desired, the BIOS 132, the OS 134, or another entity can request the BMC 102 to store the protected information in a persistent storage medium (e.g., 130). The protected information can subsequently be retrieved from the system memory 108 or the persistent storage medium, again invoking the BMC 102. For example, an entity (which can be the same as or different from the entity that requested the protection of information) can request that the BMC 102 decrypt encrypted information using the key 110 in the BMC 102.

In another example, the BIOS 132, the OS 134 (FIG. 1), or another entity in the computer system 100 may request the BMC 102 cryptographically sign information in the system memory 108 to irrefutably bind the protected information to the computer system 100, such that the protected information would not be accessible outside the context of the computer system 100, or more specifically, outside the operator plane of the computer system 100.

FIG. 2 shows an example in which information in the system memory 108 is encrypted. The operator plane entity 202 sends (at 204) an encrypt indication to the BMC 102. The encrypt indication can be in the form of a command, a message, an information element, or any other type of indication.

In some examples, the encrypt indication can indicate (e.g., using a flag settable to one of multiple different values) whether the information 106 is encrypted in place or encrypted at offset. The flag may be part of a configuration register (such as in a configuration space of the system memory 108), or in another storage space. Encrypting information in place refers to retrieving cleartext information from the system memory 108 at a storage location, generating the encrypted information by encrypting the cleartext information, and storing the encrypted information in the same storage location from which the cleartext information was retrieved. In other words, encryption in place causes the cleartext information in the system memory 108 to be replaced with the encrypted information by the BMC 102.

Encryption at offset refers to retrieving cleartext information from a first storage location of the system memory 108, producing encrypted information, and storing the encrypted information at a second storage location in the system memory 108, where the second storage location is different (at an offset) from the first storage location. Encryption at offset allows for both the cleartext information and the encrypted information to be present in the system memory 108.

Although examples refer to the operator plane entity 202 sending an encrypt indication to the BMC 102 to cause encryption of information, in other examples, a decrypt indication can be sent by the operator plane entity 202 to decrypt encrypted information in the system memory 108. As with encryption, decryption can occur in place or at offset. Decryption in place means the encrypted information is retrieved from a storage location in the system memory 108, the encrypted information is decrypted to produce cleartext information, and the cleartext information is stored at the same storage location in the system memory 108, which replaces the encrypted information. Decryption at offset means that the encrypted information is retrieved from a first storage location in the system memory 108, the encrypted information is decrypted to produce cleartext information, and the cleartext information is stored at a second storage location in the system memory 108, where the second storage location is offset from the first storage location.

In response to the encrypt indication, the BMC 102 performs a DMA read (at 206) of information in the system memory 108. Using the encryption key 110, the BMC 102 encrypts (at 208) the information read from the system memory 108. The BMC 102 performs a DMA write (at 210) of the encrypted information to the system memory 108. The storage location at which the encrypted information is written is based on whether the encryption is in place or at offset.

Figure 3:
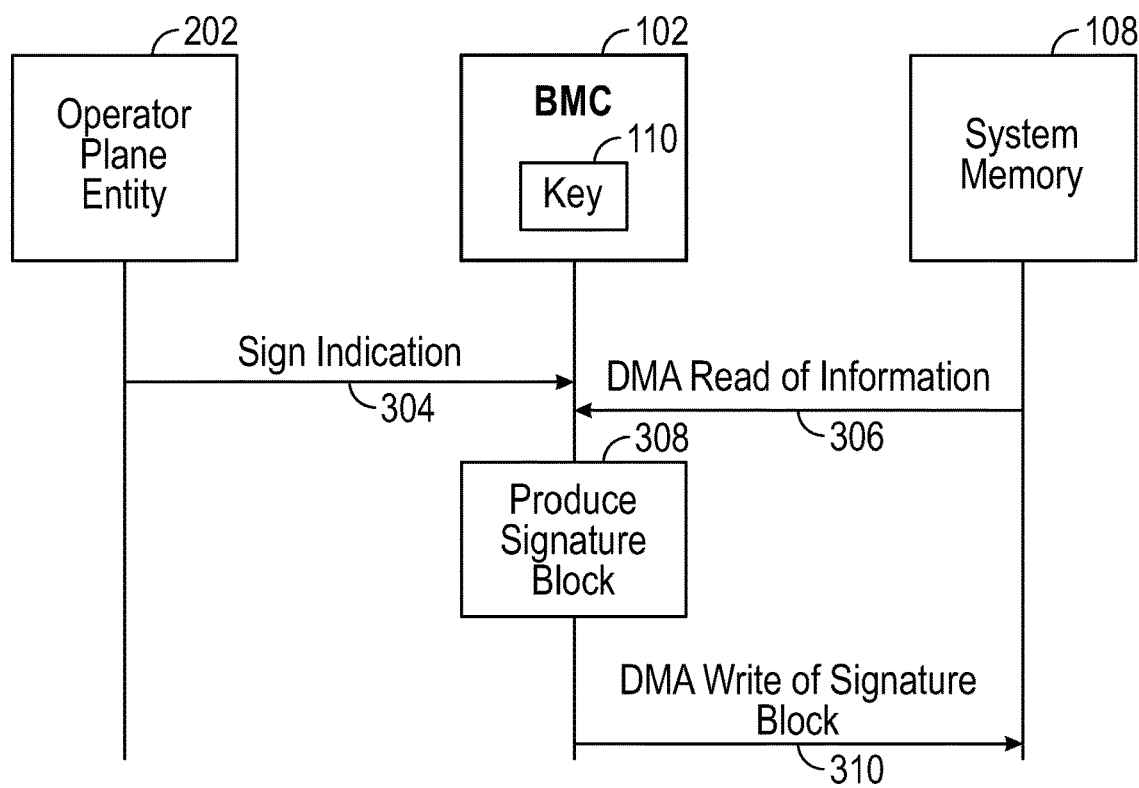
FIG. 3 is a flow diagram of a signing process according to some examples.

In other examples, as shown in FIG. 3, the operator plane entity 202 can send (at 304) a sign indication to cause signing of the information 106 in the system memory 108. The BMC 102 signs information by performing a DMA read (at 306) of information from the system memory 108, producing (at 308) a signature block including a digital signature using the key 110, and performing a DMA write (at 310) of the signature block at a different location that is offset from the storage location of the information 106 in the system memory 108.

An example use of digital signing of the information 106 in the system memory 108 includes signing a log (or other information) for audit purposes. For example, the digital signature can irrefutably bind the log (or other information) to the computer system 100. There can be other uses of digital signing of the information 106.

Figure 4:
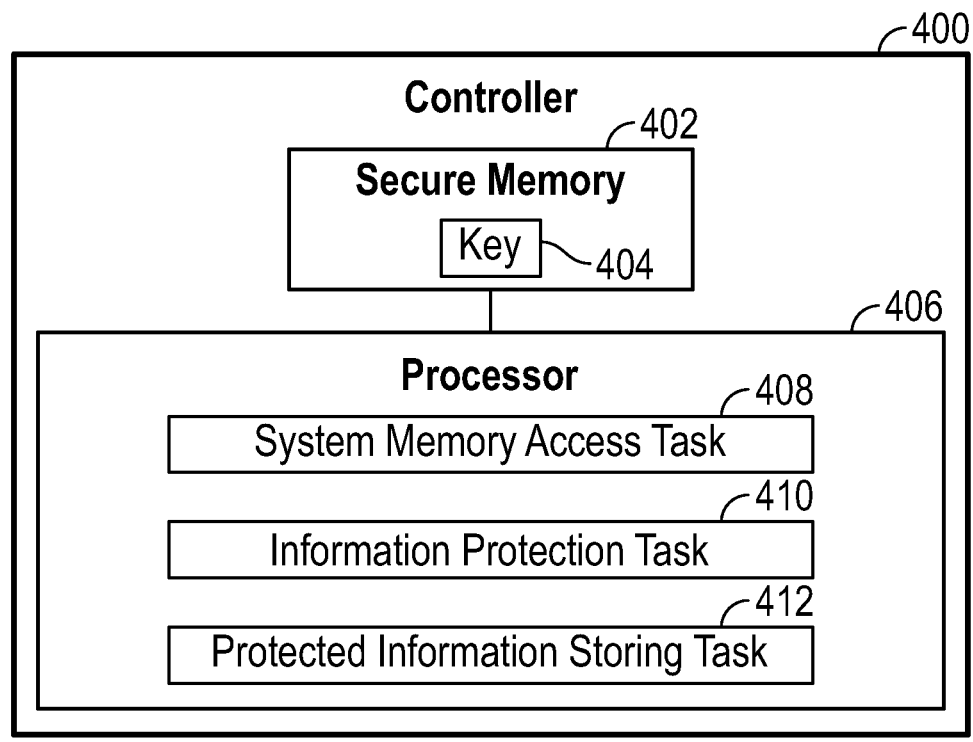
FIG. 4 is a block diagram of a controller according to some examples.

FIG. 4 is a block diagram of a controller 400 (e.g., the BMC 102 of FIGS. 1-3 or another type of controller for performing security operations) according to some examples. The controller 400 includes a secure memory 402 to store a key 404. The key 404 in the secure memory 402 is inaccessible to an entity outside the controller 400.

The controller 400 also includes a processor 406 to perform various tasks. For example, the processor 406 can execute machine-readable instructions (e.g., 118 in FIG. 1) to perform the various tasks.

The tasks include a system memory access task 408 that accesses a system memory that is external of the controller 400 and that is accessible by a main processor separate from the controller 400. In some examples, the processor 406 accesses the system memory using DMA.

The tasks include an information protection task 410 to protect information retrieved from the system memory using the key 404 to produce protected information. In some examples, protecting the information using the key 404 includes encrypting the information using the key 404, where the protected information includes encrypted information produced by the encrypting. In further examples, protecting the information using the key 404 includes cryptographically signing the information using the key 404 to produce a digital signature, where the protected information includes the digital signature.

In some examples, protecting the information using the key 404 is performed in a security domain (e.g., an operator plane) that includes hardware and a bare metal OS of a computer system including the system memory and the main processor. In some examples, the security domain is separate from a user domain (e.g., a data plane) of the computer system, where the user domain may be associated with a tenant of an as-a-Service (aaS) provided by the computer system.

The tasks include a protected information storing task 412 to store the protected information in the system memory. In some examples, the protected information is stored by performing a DMA write of the protected information from the controller 400 to the system memory.

Figure 5:
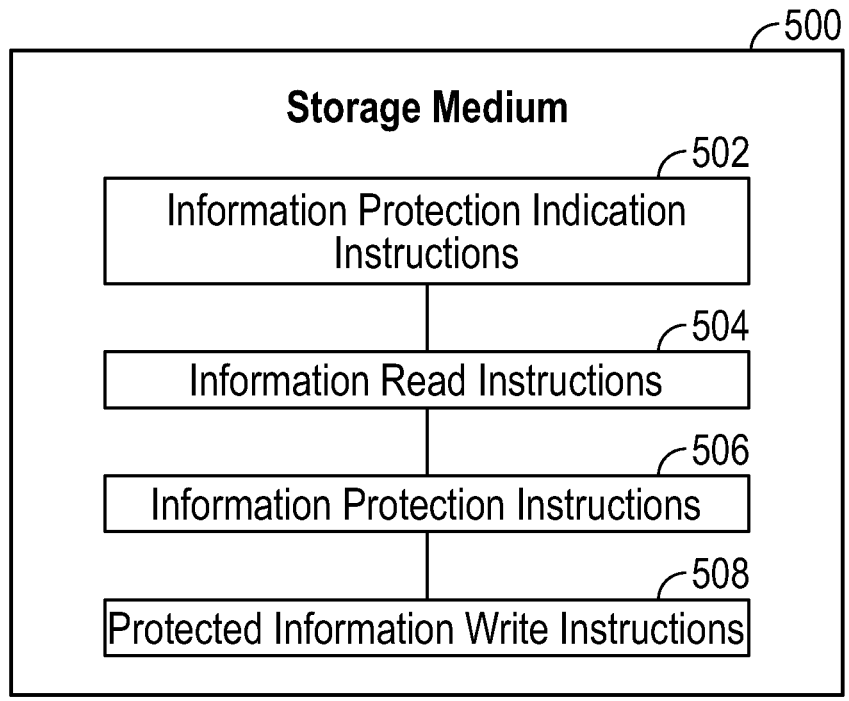
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a controller (e.g., a BMC or another type of controller) to perform various tasks.

The machine-readable instructions include information protection indication reception instructions 502 to receive an indication to protect information in a system memory of a computer system, the system memory separate from the controller. In some examples, the indication is from a requesting entity (e.g., 202 in FIG. 2) that is in a security domain different from a domain associated with a tenant of the computer system.

The machine-readable instructions include information read instructions 504 to read the information from the system memory. In some examples, the reading is performed using a DMA read.

The machine-readable instructions include information protection instructions 506 to protect, using a key in the controller that is inaccessible to an entity outside of the controller, the information to produce protected information. In some examples, the protecting of the information in the security domain is invisible to the tenant. In some examples, the protected information includes an encrypted version of the information. In further examples, the protected information includes a digital signature based on cryptographic signing of the information.

The machine-readable instructions include protected information write instructions 508 to write the protected information to the system memory. In some examples, the writing is performed using a DMA write.

Figure 6:
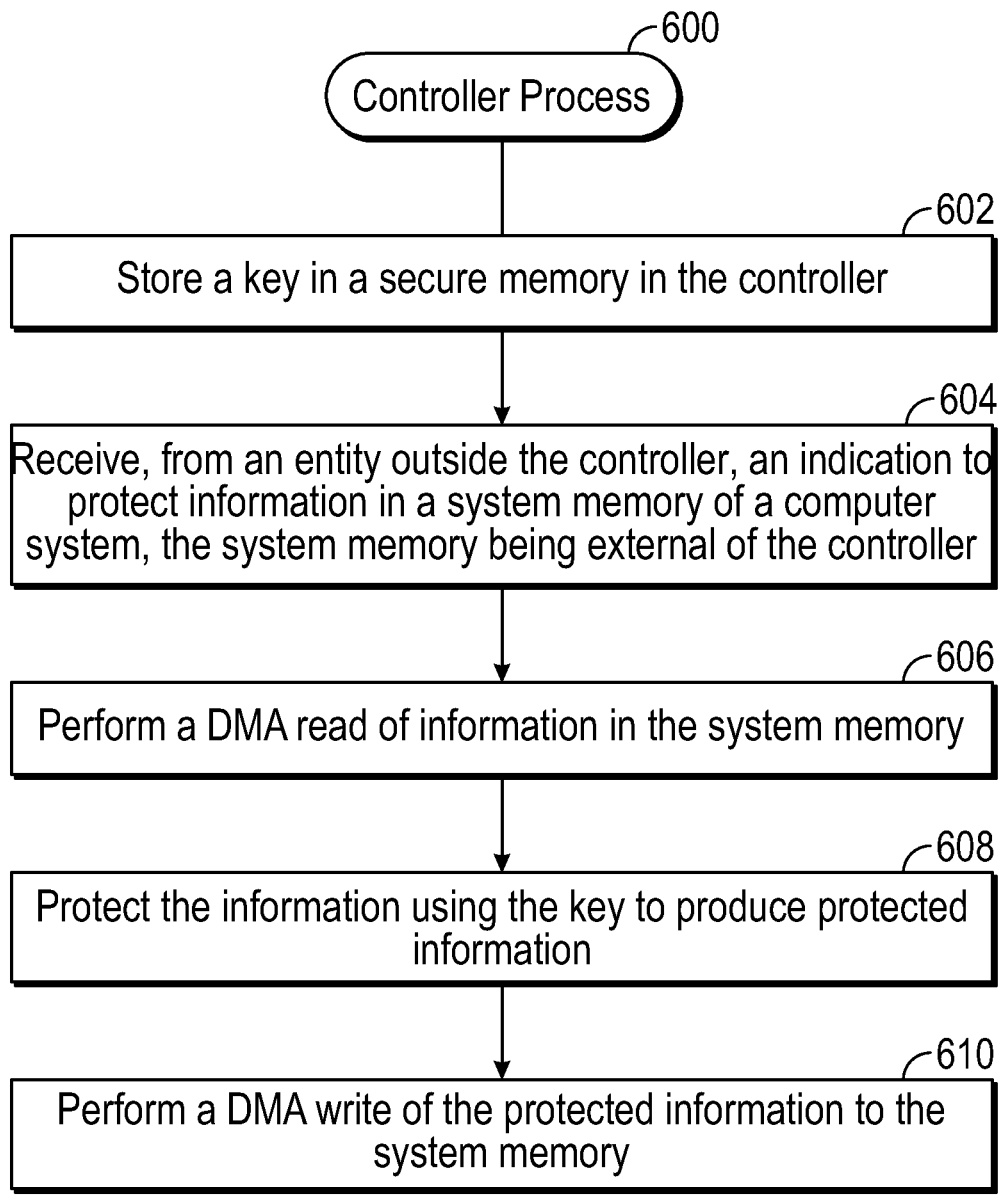
FIG. 6 is a flow diagram of a controller process according to some examples.

FIG. 6 is a flow diagram of a controller process 600 that is performed by a controller (e.g., a BMC or another type of controller).

The controller process 600 includes storing (at 602) a key in a secure memory in the controller. The key stored in the secure memory is inaccessible to an entity outside the controller.

The controller process 600 includes receiving (at 604), from the entity outside the controller, an indication to protect information in a system memory of a computer system, the system memory being external of the controller. The entity can be in a security domain that is separate from a domain associated with a tenant of the computer system, in some examples.

The controller process 600 includes performing (at 606) a DMA read of information in the system memory. The information may be read from a first storage location in the system memory.

The controller process 600 includes protecting (at 608) the information using the key to produce protected information. Protecting the information can include encrypting the information or cryptographically signing the information.

The controller process 600 includes performing (at 610) a DMA write of the protected information to the system memory. The protected information can be written to the same first storage location in the system memory, or to another storage location in the system memory.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
   a secure memory to store a key; and
   a processor to:
      receive, at the controller from an entity outside the controller, an indication to protect information in a system memory of a computer system, the system memory external of the controller,
      in response to the indication, access using a direct memory access (DMA) read by the controller, the system memory that is external of the controller and that is accessible by a main processor separate from the controller,
      protect, at the controller with the key, the information retrieved from the system memory using the DMA read to produce protected information, and
      store the protected information in the system memory using a DMA write by the controller.

2. The controller of claim 1, wherein the entity comprises an operating system (OS) or a Basic Input/Output System (BIOS), and the indication received at the controller is from the OS or the BIOS.

3. The controller of claim 1, wherein the key in the secure memory is inaccessible to the entity outside the controller.

4. The controller of claim 1, wherein the protecting of the information with the key comprises encrypting the information using the key, and wherein the protected information comprises encrypted information produced by the encrypting.

5. The controller of claim 4, wherein the encrypting of the information using the key comprises encrypting the information in place in the system memory.

6. The controller of claim 4, wherein the encrypting of the information using the key comprises encrypting the information at an offset such that the encrypted information is stored in the system memory at the offset from a location of a cleartext version of the information in the system memory.

7. The controller of claim 1, wherein the protecting of the information with the key comprises cryptographically signing the information using the key to produce a digital signature, and wherein the protected information comprises the digital signature.

8. The controller of claim 1, wherein the protecting of the information with the key is performed in a security domain that includes hardware and a bare metal operating system (OS) of the computer system comprising the system memory and the main processor.

9. The controller of claim 8, wherein the security domain is separate from a user domain of the computer system.

10. The controller of claim 9, wherein the user domain is associated with a tenant of an as-a-Service (aaS) provided by the computer system.

11. The controller of claim 1, comprising a secret,
    wherein the processor is to generate the key based on the secret.

12. The controller of claim 1, wherein the controller is a baseboard management controller.

13. A non-transitory machine-readable storage medium comprising instructions that upon execution cause a controller to:

receive, at the controller from an entity outside the controller, an indication to protect information in a system memory of a computer system, the system memory external of the controller and accessible by a main processor separate from the controller;

in response to the indication, retrieve, by the controller using a direct memory access (DMA) read, the information from the system memory;

protect, at the controller using a key in a secure memory in the controller, the information retrieved from the system memory using the DMA read to produce protected information, wherein the key in the secure memory is inaccessible to the entity outside of the controller; and write the protected information using a DMA write to the system memory.

14. The non-transitory machine-readable storage medium of claim 13, wherein the indication is from a requesting the entity that is in a security domain different from a domain associated with a tenant of the computer system.

15. The non-transitory machine-readable storage medium of claim 14, wherein the protecting of the information in the security domain is invisible to the tenant.

16. The non-transitory machine-readable storage medium of claim 13, wherein the entity comprises an operating system (OS) or a Basic Input/Output System (BIOS), and the indication received at the controller is from the OS or the BIOS.

17. The non-transitory machine-readable storage medium of claim 13, wherein the protected information comprises an encrypted version of the information or a digital signature based on cryptographic signing of the information.

18. A method of a controller, comprising:

storing a key in a secure memory in the controller;

receiving, by the controller from an entity outside the controller, an indication to protect information in a system memory of a computer system, the system memory external of the controller;

performing, by the controller in response to the indication, a direct memory access (DMA) read of the information in the system memory;

protecting, by the controller using the key stored in the secure memory in the controller, the information retrieved from the system memory by the DMA read to produce protected information; and performing, by the controller, a DMA write of the protected information to the system memory.

19. The method of claim 18, wherein the protecting of the information comprises encrypting the information or cryptographically signing the information.

20. The method of claim 18, wherein the entity is in an operator plane of the computer system, the operator plane separate from a data plane associated with a tenant of the computer system.

\* \* \* \* \*